July 26, 1966   A. C. STULTS ETAL   3,262,445
HEATING MEANS AND CONTAINER COMPRISING SAME
Filed May 17, 1965   2 Sheets-Sheet 1
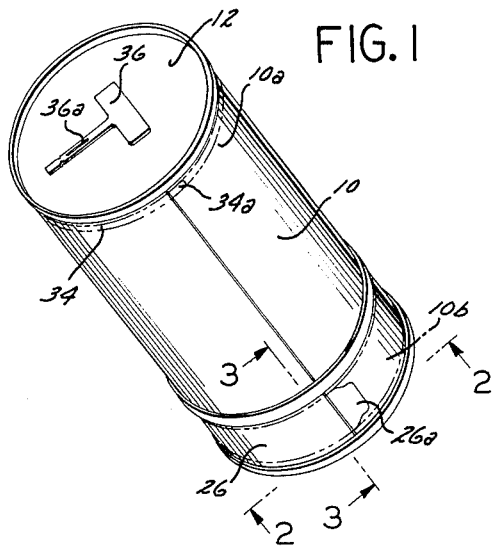
FIG. 1
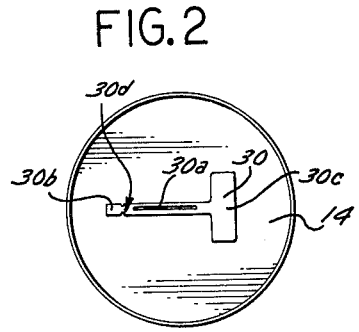
FIG. 2
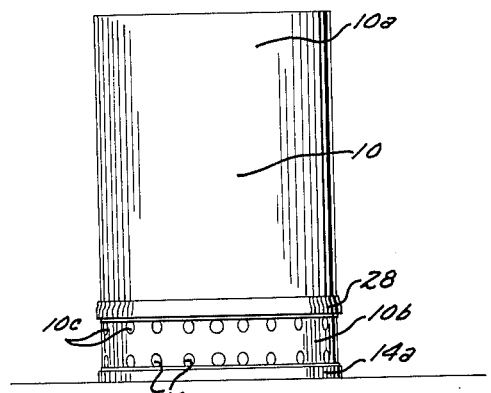
FIG. 3
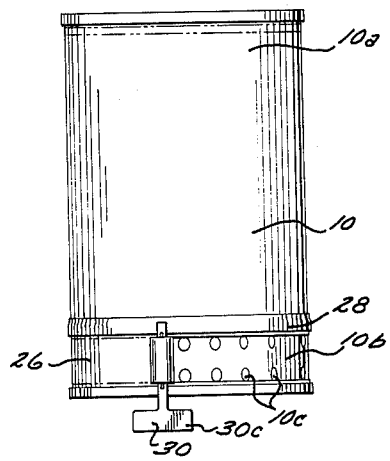
FIG. 4
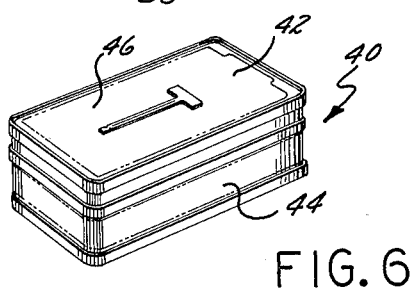
FIG. 5
FIG. 6
INVENTORS.
ALLAN C. STULTS
RAYMOND H. POWELL
BY
ATTORNEY July 26, 1966    A. C. STULTS ETAL    3,262,445
HEATING MEANS AND CONTAINER COMPRISING SAME
Filed May 17, 1965    2 Sheets-Sheet 2

INVENTORS.
ALLAN C. STULTS
RAYMOND H. POWELL
BY
ATTORNEY

United States Patent Office 3,262,445
Patented July 26, 1966

3,262,445
HEATING MEANS AND CONTAINER COMPRISING SAME
Allan C. Stults, 929 Vista Del Playa, Orange, Calif., and Raymond H. Powell, 18212 Avolinda, Yorba Linda, Calif.
Filed May 17, 1965, Ser. No. 456,220
3 Claims. (Cl. 126—262)

This is a continuation-in-part of application Serial No. 337,416, filed January 13, 1964, now abandoned.

The present invention relates generally to heating means and container comprising same, and more particularly to containers and heating means for materials such as foodstuff.

Heretofore, containers of widely different styles, construction and design have been available in virtually any kind of material. For instance, foodstuff has been stored in metal containers, glass containers and paper containers of various designs. In preparing such food for consumption, the contents of such containers is usually removed and placed in a sauce pan or the like, the latter being placed over a source of heat. In the alternative, heretofore the food to be heated would be allowed to remain in the metal container as originally packaged, and this container would be positioned over the heating unit.

Under certain circumstances or during certain activities, as for instance at picnics, on vacation trips or while participating in outdoor activities, it is frequently inconvenient and extremely difficult to have heating means such as stoves readily available. That is, the design of prior containers for food has been such that to provide a warm meal during a hunting trip or the like it was necessary to transport a stove or other type of heating device on the hunting trip. As will be readily appreciated, the weight and space occupied by such additional article presented an increased burden throughout the entire trip since the heating device had to be carried back to the original part of departure.

Portable heating devices have also become popular within recent years for use during camping, picnicking and other outdoor trips. However, such prior devices have left much to be desired and have frequently created hazardous situations resulting in uncontrolled fires and inadvertent explosions. That is, prior portable stoves and the like have been so constructed that the fuels used therein have been permitted to form explosive mixtures near or within the unit itself.

Prior portable stoves have also been very cumbersome and heavy to transport, and hence have been virtually non-portable. The types of fuel heretofore employed and the types of containers used in constructing such portable stoves have resulted in extremely bulky units.

In view of the foregoing, it is an object of the present invention to provide a container which is so constructed as to have two separated though juxtaposed compartments.

Another object of the present invention is to provide a container having a first compartment for food or other material to be heated, and a second compartment for housing means therefor.

Another object of the present invention is to provide a container having self-contained relatively inexpensive heating means, which container can be disposed of after the contents has been used.

A further object of the present invention is to provide a container as characterized above having manually operable means associated with each compartment so that the food or other contents as well as the heating means can be made available as required.

A further object of the present invention is to provide a container as characterized above wherein closure means is provided for the compartment containing the heating means which closure means can be removed to permit the heating means to be exposed to the air for proper combustion of the heating means.

A further object of the present invention is to provide in a container as above described heating means which comprises non-combustible mineral fill firmly packed within the compartment therefor to eliminate all voids and thereby prevent combustion of the fuel within the heating compartment.

A still further object of the present invention is to provide a container as characterized above wherein the non-combustible mineral fill is so firmly packed within the heating compartment as to protrude along an opening therein so that combustion takes places externally of the heating compartment and not therewithin.

Another object of the present invention is to provide a container as characterized above which is simple and inexpensive to manufacture and which is rugged and dependable in operation.

Another object of the present invention is to provide a portable stove which is safe to operate and which is substantially immune to explosions and unexpected fires due to spilled fuel.

Another object of the present invention is to provide a portable stove as characterized above which is capable of supporting substantially any type of cooking utensil or other object to be heated.

A still further object of the present invention is to provide a portable stove as characterized above which burns the vapor of liquid fuel rather than the liquid fuel itself, thereby providing safer conditions for the user thereof.

A still further object of the present invention is to provide a portable stove as characterized above which is simple and inexpensive to manufacture, and which is rugged and dependable in operation.

The novel features which we consider characteristic of our invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a perspective view of a container according to the present invention;

FIGURE 2 is a bottom plan view of the container of FIGURE 1, taken substantially along line 2—2 of FIGURE 1;

FIGURE 3 is a fragmentary sectional view of a portion of the container of FIGURE 1, taken substantially along line 3—3 of such figure;

FIGURE 4 is a side elevational view of such container, with closure means shown partly removed;

FIGURE 5 is a side elevational view of such container showing the closure means entirely removed;

FIGURE 6 is a perspective view of a second embodiment of the present invention;

Like reference characters indicate corresponding parts throughout the several views of the drawings.

Figure 7:
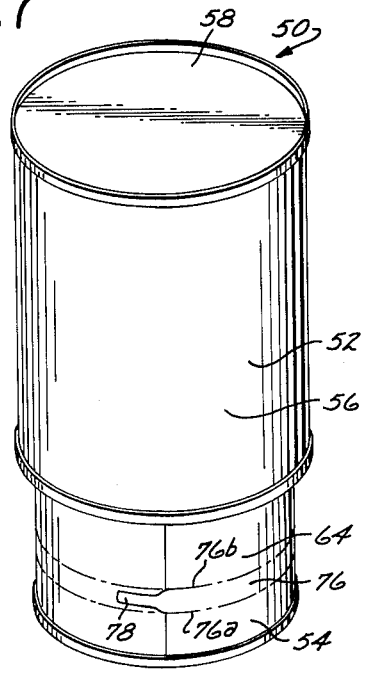
FIGURE 7 is a perspective view of a third embodiment of the present invention.
Figure 8:
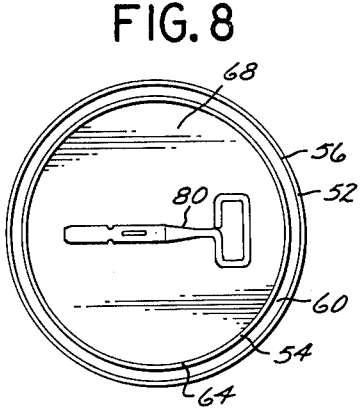
FIGURE 8 is a bottom plan view of such third embodiment.

Referring to FIGURE 1 of the drawings, there is shown therein a first embodiment of the present invention. This embodiment comprises a tubular one-piece body member 10 having an upper end portion 10a and a lower end portion 10b as best shown in FIGURES 3, 4 and 5. Such tubular body member 10 extends the entire length of the container, and is provided with end walls 12 and 14, the former being sealingly attached to the upper end 10a while the latter is sealingly attached to the lower end 10b to form within said container an enclosure 16. The end walls 12 and 14 are hermetically sealed to the respective ends of body member 10, as by soldering, welding, crimping or the like. In this manner, the enclosure 16 which extends the entire length of the container is hermetically sealed.

A partition wall 18 is secured to and within the body member 10 intermediate the end walls 12 and 14 to thereby divide the enclosure 16 into two juxtaposed compartments 20 and 22. Such partition wall is shaped to conform to the cross-section of body member 10, and may be provided with a flanged or offset peripheral edge 18a to be soldered, brazed or welded to the side wall of said body member. Partition wall 18 is thus hermetically sealed to member 10 about its periphery to thereby completely separate the several compartments 20 and 22.

The side wall of body member 10 at the lower end 10b thereof, is provided with suitable through openings 10c which, as will hereinafter be explained, permit the flow of air into and out of the compartment 22.

Closure means 24 in the form of a metal tear strip 26 is provided over the openings 10c. Such closure means 24 may take substantially any desired form, the only requisite being to effectively seal such openings 10c when the compartment 22 is not in use.

Tear strip 26 is hermetically sealed to the container 10 in any desired manner to accomplish the intended result. The embodiment shown in FIGURE 3 of the drawings, shows the tear strip 26 sealingly secured to body member 10 by an annular flange 28 at its upper end and by the crimped peripheral edge 14a of end wall 14 at its lower end. However, such attachment may be provided by any one of various other methods as by the use of continuous seam welds or the like.

Tear strip 26, as shown most clearly in FIGURE 1 is provided with a free end or tab 26a which is of reduced width to accommodate a key 30 stored against the end wall 14 of the container. Key 30 is formed with an elongated slot 30a for receiving the tab 26a. Such key is secured to end wall 14 as by soldering, welding or the like on the tip portion 30b. Such key is removed merely by lifting the handle 30c to separate the key from the tab 30b, the reduced portion 30d of key 30 aiding in such separation.

Within compartment 22 there is provided heating means 32 which may take substantially any desired form such as alcohol impregnated absorbent material. Several standard preparations are presently available for use as heating means in the present invention.

The upper end 10a of body member 10 also is provided with a tear strip 34 for use in removing the end wall 12 from the body member 10. A key 36 is attached to the end wall 12 for this purpose and is formed with a slot 36a for receiving the free end or tab 34a of strip 34. The ear strip 34 and key 36, of course, are for use in opening the compartment 20 for removal of the contents thereof, when desired.

The compartment 20 is initially filled with the food or other material and the compartment 22 is provided with the appropriate heating means 32. At the same time, of course, the respective compartments are sealed and the tear strips 26 and 34 are attached to the body member 10.

The container can be stored and eventually is transported like an ordinary can of foodstuff to the location where it is to be used. This may be a remote location on a hunting trip, a back-pack trip, a beach picnic or the like. When the food is to be consumed, the key 36 is removed from the end wall 12 and positioned on the tab 34a of tear strip 34. Thereafter, the key 36 is rotated until the strip 34 is removed from the body member 10. The upper end wall 12 of the container can then be removed to expose the contents of compartment 20.

The key 30 is then removed from the bottom end wall 14 and inserted on the tab 26a of tear strip 26. Rotation of key 30 then causes tear strip 26 to be removed from the lower end portion 10b of container 10, thereby exposing openings 10c therein.

The proper use of either of the tear strips 26 and 34 may require suitable perforations to be provided therein to insure that such tear strips will tear along predetermined lines.

After the compartments 20 and 22 have thus been opened, the heating means 32 within the latter is ignited. The resulting combustion heats the partition wall 18 as well as the side wall of the tubular body member 10, thereby heating the contents of the compartment 20. When such contents have been brought to the proper temperature, it can be removed from compartment 20. The remaining container can then be disposed of after the heating means 32 within compartment 22 has been extinguished.

Referring to FIGURE 6 of the drawings, there is shown therein a second embodiment of the present invention. This embodiment is a generally rectangular container 40 having substantially parallel opposite end walls, only the upper end wall 32 of which is shown therein. Also provided within container 40 is a partition wall affording two hermetically separate and independent compartments in juxtaposed relation.

A tear strip 44 is provided for exposing the lower or heating compartment of container 40 and a tear portion 46 is provided in end wall 42 for removal of the contents.

This invention is used in the same manner as the above described first embodiment.

Referring to FIGURE 7 of the drawings, there is shown therein a third embodiment of the present invention. Such embodiment is a combination container 50 which comprises a first enclosure 52 wherein foodstuff to be heated is stored, and a second enclosure 54 which carries heating means.

Figure 11:
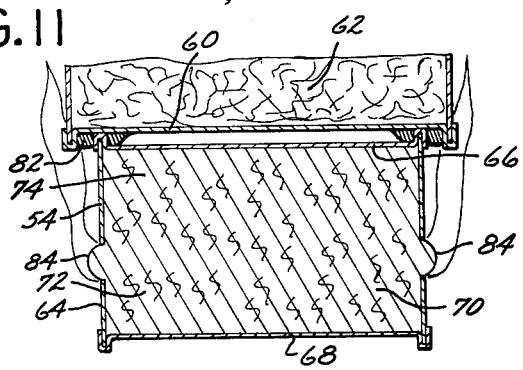
FIGURE 11 is a fragmentary sectional view through the said heating means taken substantially along line 11—11 of FIGURE 9.

The first enclosure 52 may be of substantially any desired configuration, but preferably is cylindrically-shaped having a tubular body 56, an upper end wall 58 and a lower end wall 60, the latter of which is shown most clearly in FIGURE 11 of the drawings. The foodstuff within enclosure 52 is shown in FIGURE 11 at 62. The container 52 is similar to or identical with the usual containers for pork and beans, vegetables and the like.

The enclosure 54 is provided with a generally tubular body 64, an upper end wall 66 and a lower end wall 68. The end walls 66 and 68 are suitably fastened to the opposite ends of tubular body 64 in any appropriate manner as by soldering or the like.

Enclosure 54 is provided with heating means 70 comprising a non-combustible mineral fill 72 and fluid fuel 74. The fill 72 is non-combustible so as not to be consumed during the combustion process. Also, such fill is firmly packed or compacted within the enclosure 54 to eliminate all voids or air pockets therewithin. The elimination of air from within enclosure 54 is essential to prevent combustion therewithin and to prevent explosions as will hereinafter be explained in greater detail.

The fluid fuel 74 may take substantially any desired form such as alcohol or the like which provides fumes or vapors which are capable of burning to provide a good heating flame. Such fuel is caused to saturate the mineral fill, the latter of which may be what is commonly referred to as rock wool or iron slag.

The periphery of the tubular body 64 of enclosure 54 is provided with a tear strip 76. Such strip may be formed by suitable indentations or impressions as at 76a and 76b which weaken the material thereat. The end of such strip 76 may be provided with a reduced extension 78 for cooperation with a key 80 attached to the bottom wall 68 of the enclosure 54.

The entire enclosure 54 is firmly attached to the bottom wall 60 of the enclosure 52 as by welding or gluing. As shown in FIGURE 11 of the drawings, it is contemplated that epoxy cement or glue 82 may be used to firmly secure the enclosures 52 and 54 together to provide a unitary structure. Such glue sets up merely by exposure to the atmosphere and is unaffected by subsequent heating. In fact, epoxy cements generally become firmer upon the application of heat thereto.

Figure 9:
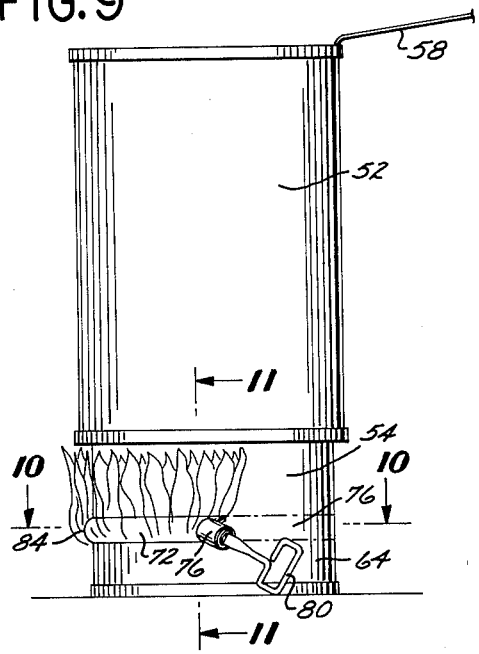
FIGURE 9 is a side elevational view of the third embodiment showing the heating means in operation.
Figure 10:
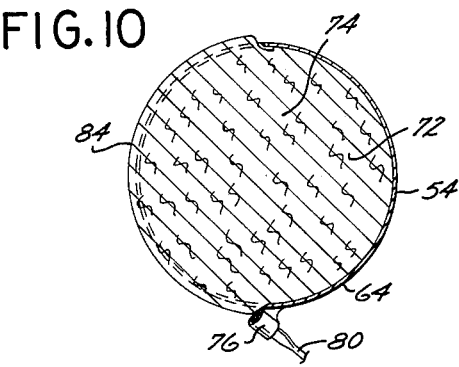
FIGURE 10 is a sectional view of the heating means, taken substantially along line 10—10 of FIGURE 9.

When it is desired to utilize the third embodiment 50, it is first necessary to remove the tear strip 76. This is accomplished in the usual manner, by removing the key 80 from end wall 68 and thereafter inserting the extension 78 of the tear strip 76 into the slot or opening in such key. As shown in FIGURES 9 and 10 of the drawings, the strip is then partially removed, it having been determined that approximately one-half the length thereof should be removed to expose the heating means 70 within the enclosure 54 for approximately one-half the distance therearound.

A necessary or desirable characteristic of the third embodiment is that the non-combustible mineral fill 72 be packed so firmly within the enclosure 54 that when the strip 76 is removed to provide a horizontal slot which extends half the distance about the enclosure 54, the fill will protrude from the enclosure as shown at 84. This feature, together with the fact that the fill 72 prevents the existence of voids within the enclosure 54, insures that only the vapor of the fuel will burn exteriorly of the enclosure. That is, only the fuel which is beyond the tubular body of the enclosure 54 will be exposed to sufficient air to vaporize, and only such vapor will be exposed to sufficient air to support combustion. The fact that the fill is firmly packed within the enclosure prevents air from entering the enclosure 54 thereby preventing combustion and explosions therewithin.

Another problem solved by the compacted mineral fill 72 is to provide support for the enclosure 54 when the tear strip 76 has been partially removed as above explained. In order to effect exposure of sufficient fuel to the air, the slot formed by the removal of tear strip 76 must be reasonably long and uninterrupted. However, this greatly weakens the tubular body 64 of enclosure 54 in supporting itself, the enclosure 52 thereon, and the contents of the latter enclosure. The firmly compacted fill 72 prevents collapse of the enclosure 54 under these conditions.

By igniting the vapor which is exposed to the air by the protruding fill as at 84, the proper flame is provided for heating the enclosure 52 and its contents. It should be particularly noted that throughout the combustion process the non-combustible material maintains itself positioned within the enclosure 54 to prevent the entrance of air. The result is the maintenance of a safe condition, the fuel burning outside the enclosure 54, and never therewithin.

Figure 12:
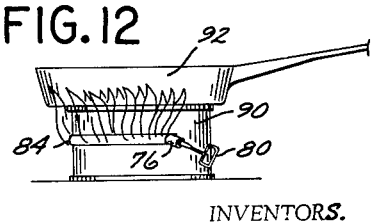
FIGURE 12 is a sectional view through a stove according to the present invention, showing means thereon to be heated.

Referring to FIGURE 12 of the drawings, there is shown therein the heating unit from the third embodiment used as a stove 90. As shown in this figure, such stove is constructed according to the heating unit shown in FIGURE 11, except that it is not firmly attached to another enclosure. Any appropriate pot 92, pan or other article to be heated may be placed on the stove 90.

Stove 90 is provided with the compacted mineral fill 72 as above described with respect to the third embodiment. Also such stove contains the liquid fuel 74 which saturates the fill for proper combustion.

As above explained with respect to the third embodiment, the compacted fill maintains the size and shape of the stove after the tear strip has been removed. Thus, when heavy pans or other articles to be heated are placed on the stove 90, the fill 72 supports the same to maintain the elongated opening in the enclosure 54 as required for proper combustion.

It has been found that the compacted mineral fill effectively prevents the fuel from being inadvertently spilled from the stove, thereby preventing the occurrence of a hazardous condition. That is, due to the fact that the fill 72 is firmly compacted within the enclosure 54, it acts as a stopper in preventing the flow of fluid in or out of the enclosure. The result of such arrangement is that the liquid fuel is not burned but rather merely the vapor thereof as exposed to the atmosphere outside the enclosure 54 is consumed. The stove 90 can be handled even after the tear strip 76 has been removed without causing the fuel to flow from the enclosure. Also, such feature enables the stove 90 to be re-used merely by placing a section of tape or other temporary sealing means across the enlongated opening in the enclosure 54 to prevent continued evaporation of the fuel. In this regard, it has been found that the heating unit when attached to the container 52 can be used as a stove merely by inverting the entire unit so that the heating unit is on top to receive pots, pans or other objects to be heated.

It is thus seen that the present invention provides novel heating means, as well as a unique container incorporating the same.

Although we have shown and described certain specific embodiments of our invention, we are fully aware that many modifications thereof are possible. Our invention, therefore is not to be restricted except insofar as is necessitated by the prior art and by the spirit of the appended claims.

We claim:

1. A combination container having self-enclosed heating means comprising in combination, a first enclosure for foodstuffs to be heated, a second enclosure attached to said first enclosure and formed with an elongated horizontal opening extending substantially the entire periphery of said second enclosure, heating means within said second enclosure comprising non-combustible mineral fill firmly packed therewithin to eliminate substantially all voids, said fill being sufficiently packed within said second enclosure to protrude therefrom through said elongated opening to provide a horizontal continuous wick externally of said enclosure, said heating means further comprising fluid fuel saturating said fill, and a removable strip covering said opening to initially hold said fill within said second enclosure, said strip being removable to permit said fill to protrude as said horizontal continuous wick, whereby said wick can be ignited to provide heating of said first enclosure externally of said second enclosure.

2. A combination container having self-enclosed heating means according to claim 1, wherein said mineral fill is sufficiently compacted within said second enclosure to support the latter when said strip is removed to thereby maintain said horizontal opening substantially the entire periphery of said enclosure.

3. A combination container having self-enclosed heating means comprising in combination, a first enclosure for foodstuffs to be heated, a second enclosure having a continuous side wall formed with an elongated horizontal opening extending substantially the entire periphery of said second enclosure, bonding material interposed between said enclosures to firmly bond them together, heating means within said second enclosure comprising non-combustible mineral fill firmly packed therewithin to eliminate substantially all voids, said fill being sufficiently packed within said second enclosure to create pressure therewithin which causes such fill to protrude therefrom through said elongated opening to provide a horizontal continuous wick externally of said enclosure, said heating means further comprising fluid fuel saturating said fill, said wick extending beyond the side wall of said second enclosure to support a flame removed from the interior of said second enclosure, and a removable strip covering said opening to initially hold said fill within said second enclosure, said strip being removable to permit said fill to protrude as said horizontal continuous wick.

References Cited by the Examiner

UNITED STATES PATENTS

| | | | |
|---|---|---|---|
| 263,928 | 9/1882 | Manuel | 126—262 |
| 1,173,454 | 2/1916 | Nakamizo | 126—262 |
| 1,325,515 | 12/1919 | Hartmann. | |
| 2,327,412 | 8/1943 | Fink. | |
| 2,643,650 | 6/1953 | Miron | 126—262 |
| 2,955,589 | 10/1960 | Boij et al. | 126—262 X |

FOREIGN PATENTS 315,820   3/1929   Great Britain.

CHARLES J. MYHRE, *Primary Examiner.*